(12) United States Patent
Hawkes

(10) Patent No.: US 6,860,408 B2
(45) Date of Patent: Mar. 1, 2005

(54) AUGER APPARATUS FOR CONVEYING ICE

(75) Inventor: Richard Blair Hawkes, Bethlehem, PA (US)

(73) Assignee: Follett Corporation, Easton, PA (US)

( * ) Notice: Subject to any disclaimer, the term of this patent is extended or adjusted under 35 U.S.C. 154(b) by 135 days.

(21) Appl. No.: 10/155,576

(22) Filed: May 24, 2002

(65) Prior Publication Data

US 2003/0218025 A1 Nov. 27, 2003

(51) Int. Cl.⁷ .............................. B67D 5/62
(52) U.S. Cl. .............. 222/146.6; 222/241; 222/413; 198/671; 198/676
(58) Field of Search ............ 222/146.6, 410–414, 222/239–242, 273, 564, 561, 547; 62/344; 198/676, 661, 660, 671

(56) References Cited

U.S. PATENT DOCUMENTS

| | | | |
|---|---|---|---|
| 3,183,682 A | | 5/1965 | Conto |
| 3,196,624 A | | 7/1965 | Reynolds |
| 3,371,505 A | | 3/1968 | Raver et al. |
| 3,580,389 A | * | 5/1971 | Nonnenmacher ............ 198/625 |
| 3,602,406 A | * | 8/1971 | Jacobus et al. ............. 222/413 |
| 3,705,644 A | * | 12/1972 | Kawchitch ................. 198/664 |
| 3,837,587 A | * | 9/1974 | Walter et al. ............. 241/260.1 |
| 3,937,365 A | | 2/1976 | Shelley et al. |
| 3,942,455 A | * | 3/1976 | Wallis ...................... 110/257 |
| 4,168,805 A | | 9/1979 | Taylor |
| 4,295,285 A | * | 10/1981 | Stevens .................... 37/246 |
| 4,356,910 A | * | 11/1982 | Togstad ..................... 198/660 |
| 4,512,502 A | | 4/1985 | Landers |
| 4,569,209 A | | 2/1986 | Strauss |
| 4,574,593 A | | 3/1986 | Nelson |
| 4,576,016 A | | 3/1986 | Nelson |
| 4,682,475 A | * | 7/1987 | Nelson ...................... 62/354 |
| 4,694,661 A | | 9/1987 | Landers |
| 4,732,301 A | * | 3/1988 | Tobias et al. ................ 222/203 |
| 4,788,830 A | * | 12/1988 | Schreiner et al. ........... 62/344 |
| 4,932,223 A | * | 6/1990 | Paul et al. .................... 62/354 |
| 4,969,583 A | | 11/1990 | Torimitsu et al. |
| 5,029,737 A | | 7/1991 | Yamamoto |
| 5,088,300 A | | 2/1992 | Wessa |
| 5,191,772 A | | 3/1993 | Engel |
| 5,277,016 A | | 1/1994 | Williams et al. |
| 5,669,531 A | * | 9/1997 | Hagemeyer ............ 222/153.14 |
| 5,910,164 A | | 6/1999 | Snelling et al. |
| 5,911,749 A | | 6/1999 | Sugie |
| 5,974,823 A | | 11/1999 | Banno et al. |
| 6,299,026 B1 | * | 10/2001 | Jaleel et al. ............. 222/146.6 |

FOREIGN PATENT DOCUMENTS

WO    WO-00/52400    * 9/2000    ............ F25C/5/00

* cited by examiner

Primary Examiner—Frederick Nicolas
(74) Attorney, Agent, or Firm—Paul & Paul

(57) ABSTRACT

An auger apparatus for conveying ice, together with the auger itself and an apparatus for storing ice in a storage bin which uses such an auger apparatus is provided. The auger is disposed in a tube, and does not require cylindrical bearings at its ends. The auger is rotationally molded, of one-piece hollow molded construction, preferably of a plastic such as polyethylene.

19 Claims, 4 Drawing Sheets

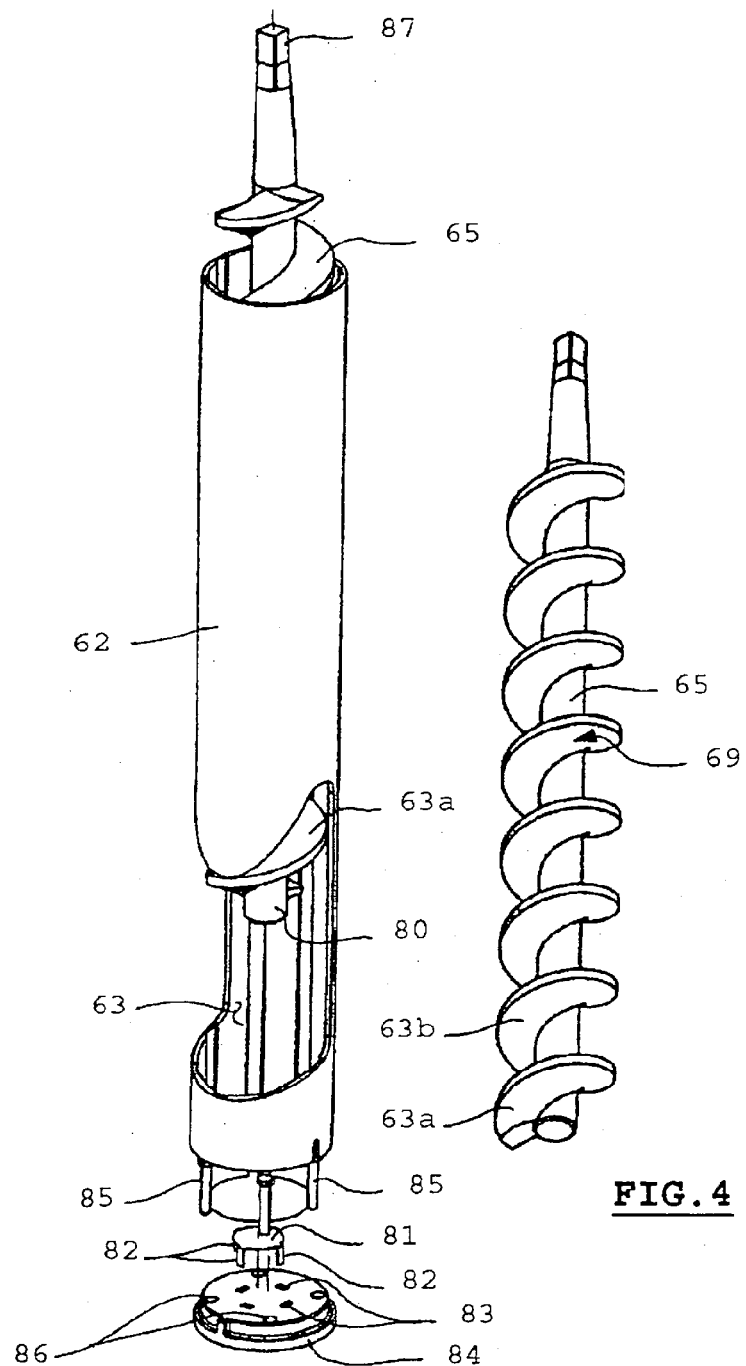

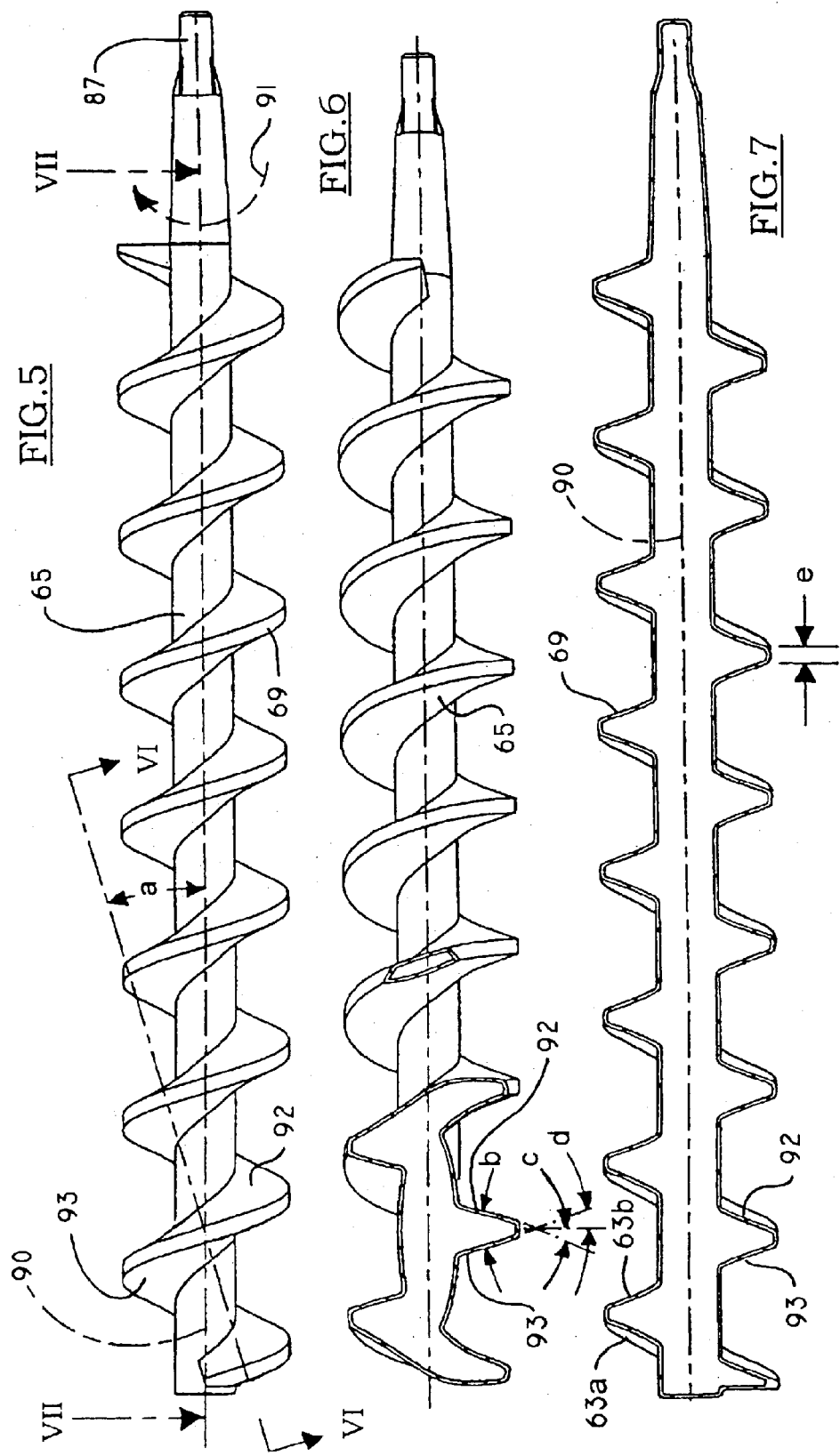

AUGER APPARATUS FOR CONVEYING ICE

BACKGROUND OF THE INVENTION

Auger apparatus for conveying ice are used in many situations, wherein ice is periodically made or generated and, for example, is delivered or dropped into a storage bin, where it resides until the need arises to use the ice.

In the past, such augers are rotatably mounted in a dispensing tube, via cylindrical bearings disposed about the auger shaft at each end of the tube.

It has been commonplace that such augers are comprised of welded stainless steel, and, where such augers are used to convey ice and other food products, the profile and finish of the auger must meet certain governmental requirements, to prevent ice and other food products from adhering to the surface of the auger, in various pores or rough spots on the surface of the auger. In the past, such auger surfaces were required to have the equivalent of a 100 grit finish or better, where stainless steel was the material from which the auger was made.

Additionally, steel augers have been expensive to manufactures and to operate. Simply the weight of the steel auger required heavy bearings at each end to carry and guide the auger. Where ice or other food products were to be handled by the auger, when it was necessary to clean the auger, the weight of the auger made it cumbersome at such times as the auger was removed for cleaning.

SUMMARY OF INVENTION

The present invention is directed to an auger and auger apparatus, as well as an apparatus for storing ice that uses an auger, wherein the auger is hollow and is molded and lightweight. The auger is molded rotationally out of plastic and requires no separate grinding and finishing operations. Because it is disposed in an auger tube and is lightweight and has broad flight lands, no bearings are required to carry the auger at either end. The rotation of the auger within the auger tube is guided by the auger tube.

Accordingly, it is an object of this invention to provide a novel auger for conveying ice and other food materials, wherein the auger is of one-piece molded construction.

It is another object of this invention to accomplish the above object, wherein the auger is molded from plastic, via rotational molding techniques.

It is a further object of this invention to accomplish the above objects, wherein the cross-section through the flight of an auger is within the range of 35° to 42°, when measured through the flight and intersecting the shaft axis.

It is a further object to accomplish the above object, wherein the included angle is substantially 38°.

It is another object of this invention to provide a flat zone at the edge of the flight, to provide a bearing surface for the auger in its tube.

It is a further object of this invention to accomplish the above objects, wherein the auger shaft is free of any cylindrical bearings disposed thereabout.

Other objects and advantages of the present invention will be readily understood upon reading the following brief descriptions of the drawing figures, detailed descriptions of the preferred embodiments, and the appended claims.

BRIEF DESCRIPTIONS OF THE DRAWING FIGURES

FIG. 3 is a vertical perspective view of an auger tube and auger disposed therein, in exploded illustration.

FIG. 4 is a vertical perspective view of an auger of the type that is used with the auger tube of FIG. 3.

FIG. 5 is a top plan view of an auger of the type of FIG. 4, longitudinally arranged.

FIG. 6 is an illustration of the auger of FIG. 5, taken generally along the line VI—VI of FIG. 5.

FIG. 7 is a longitudinal sectional view of the auger of FIG. 5, taken generally along the line VII—VII of FIG. 5.

DETAILED DESCRIPTION OF THE PREFERRED EMBODIMENTS

Figure 1:
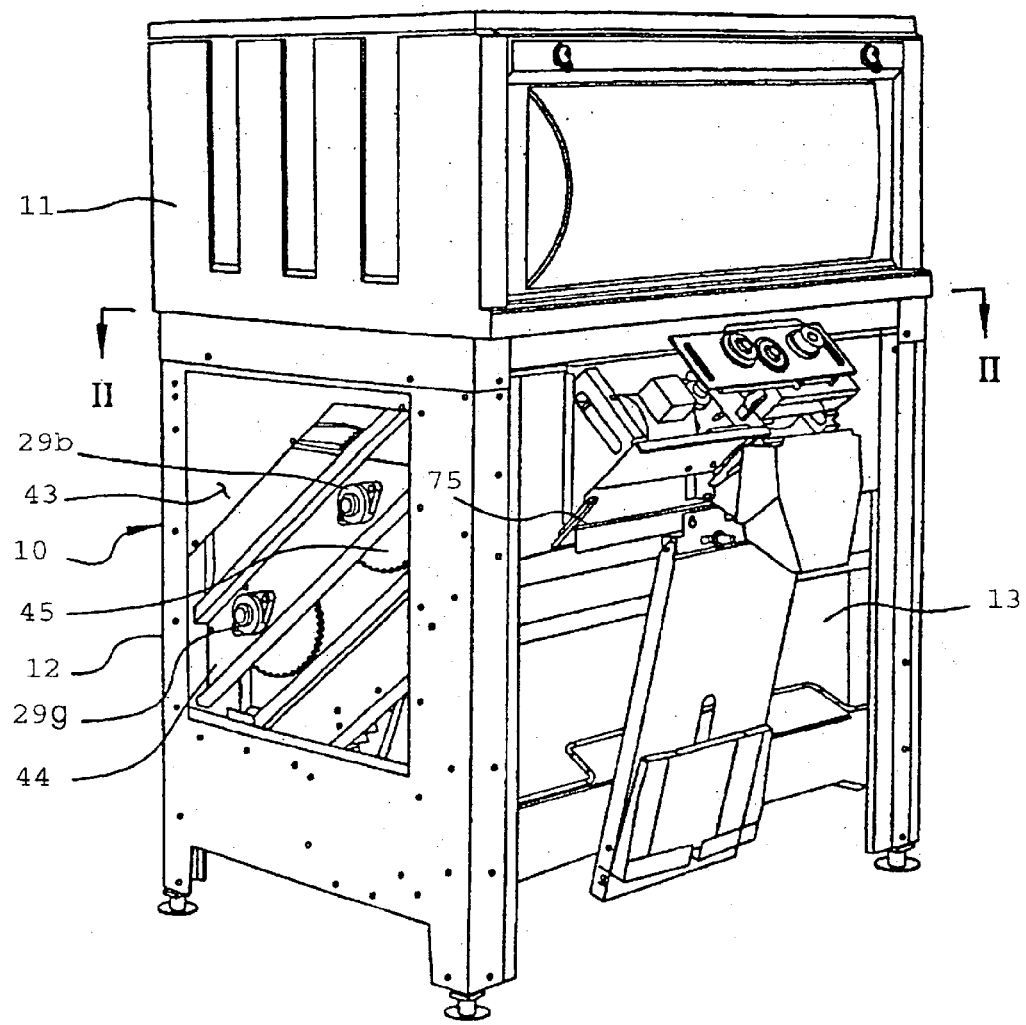
FIG. 1 is a front perspective view of an auger conveyor apparatus of this invention.

Referring now to the drawings in detail, reference is first made to FIG. 1, wherein there is shown the apparatus 10 including an upper ice bin 11 and a lower ice bin apparatus 12.

The ice making apparatus (not shown) may be of any conventional type, in that the particular ice making apparatus does not form an essential part of the present invention. Generally, the ice making apparatus will, however, be a suitable type of apparatus for making ice in the form of ice cubes, pieces, particles, or nuggets, and will generally be disposed above the upper bin 11, although, in the alternative, the same could be disposed at a location remote from the ice bin 11, with a suitable delivery system for delivering ice into the ice storage area provided by the bin 11. However, preferably, the ice making apparatus will be disposed generally above the bin 11, such that ice may pass to the bin 11, via gravity, and then enter the bin 12, via gravity.

Figure 2:
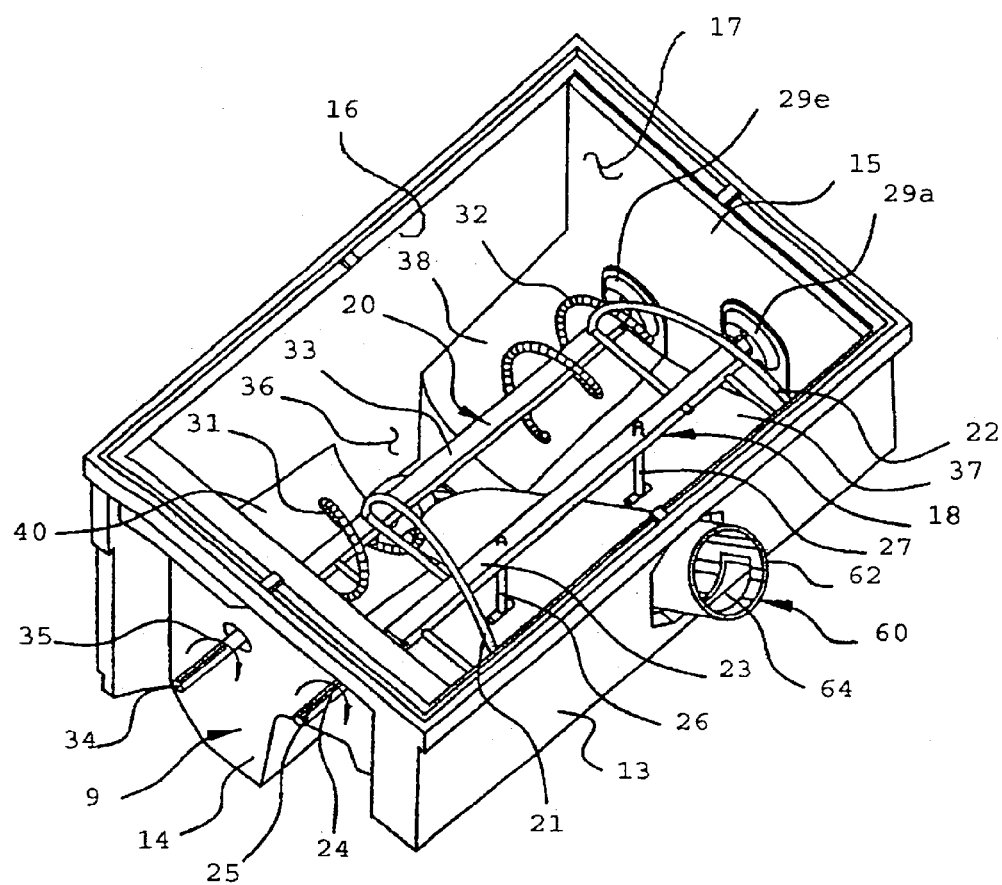
FIG. 2 is a fragmentary top perspective view of the upper end of an ice bin apparatus and auger conveyor tube for receiving an auger of this invention, as viewed generally along the plane II—II of FIG. 1.

With reference to FIG. 2, it will be seen that bin 9 has front, left and right side and back walls 13–16, as shown, and an open upper end 17, for receipt of ice therein.

Ice agitators 18 and 20 are provided in the bin 9.

Agitator 18 comprises a pair of left and right wire augers 21 and 22, preferably generally helically constructed, as shown, each carried by the same agitator bar 23, such that, when the shaft 25 is rotated in the clockwise direction shown at 24, the bar 23 which is connected to the shaft 25 will likewise rotate in the clockwise direction, such that the augers 21,22 will tend to drive ice toward the opposite auger, such that ice pieces or particles will tend to move toward the center of the bin 9, between the walls, 14, 15.

The bar 23 may likewise carry radial rods 26, 27, generally configured as shown, to also facilitate ice breakup.

The agitator 20 likewise comprises a pair of oppositely arranged, preferably helically configured wire augers 31,32, carried by the bar 33, that is likewise driven by shaft 34, for rotation in a clockwise direction 35, for conveying ice toward a central zone 36 generally near the back wall 16, at the lower end of the bin 9. The augers, 31,32, like the augers, 21,22, being arranged in pairs carried by their respective bars 33,23, are disposed such that the thrust loads resulting from conveying ice are caused to oppose each other.

It will also be noted that the sloped bottom wall 37 near the front wall 13 and the curved bottom wall portions 38,40 near the back wall 16 are configured to cooperate with the augers of the respective agitators 18, 20, to cooperate in moving ice pieces or particles toward the central back or rear zone 36.

The agitator shafts 25, 34 are mounted in appropriate bearings 29a, 29b, 29e and 29g, carried on opposite frame members 44, on each side of the frame, outside respective side walls 15, 14 of bin 9. In this regard, it will be noted that in FIG. 1 a sheet metal cover 43 is shown as being open, for the sake of clarity.

Referring now to FIG. 3, it will be seen that the auger inlet 63 is shown, for receiving ice therein between adjacent revolutions 63a, 63b (see FIG. 4) of the spiral and preferable, helical flight 69 of the auger 65. It will be noted that, in the illustration of FIG. 3, the auger 65 is raised somewhat within the tube 62, to illustrate the features of the lower end of the assembly of FIG. 3, but that, in normal operation, the lower revolution 63a of the auger 65 will be disposed vertically lower than that shown in FIG. 3, such that the thrust end 80 will be disposed against the thrust plate 81, the legs 82 of which will be disposed in and carried by slotted openings 83 of end cap 84 and that suitable threaded rods 85 will fasten the assembly of FIG. 3 by engagement in openings 86 of end cap 84. The upper end will generally have a rectangular cross-section 87 for driving engagement of the auger 65, as described above, such that the auger 65 will be driven about its longitudinal axis 90 as the auger 65 is rotationally driven in the direction of the arrow 91, as shown in FIG. 5.

The continuous flight 69 of the auger 65 thus, when rotationally driven, will operate such that the forward, active delivery surface 92 will engage ice and push it from left to right as viewed in FIG. 5.

As shown in FIG. 6, a transverse cross-section taken through the flight 69, transverse to the active and passive surfaces 92 and 93 respectively, along the line VI—VI, and intersecting the shaft axis 90, will show that the included angle "b" between the surfaces 92,93, will be within the range of 35° to 42°, and most preferably will be substantially 38°.

Most preferably, the angle "c" between the surface 92 and the vertical as shown in FIG. 6 will be 19°, just as the angle "d" between the surface 93 and the vertical will also most preferably be 19°.

With reference to section VI—VI of FIG. 5, and as shown in FIG. 6, the cross-section throught the flight of the auger is within the range of 35° to 42°, with the section plane VI—VI being normal to the flight path.

It will be noted that there is a flat, shown as dimension "e" in FIG. 7, on the edge of the flight, throughout its length. This flight flat defines a surface of revolution which provides a bearing surface when the auger is disposed in its tube, for rotation therein. Preferably, the dimension "e" is about ½ inch to provide adequate bearing surface. Also, as part of the rotational molding process, in order to be hollow inside the auger at such locations, some thickness for this dimension "e" is required.

It will be seen from FIGS. 6 and 7 that the continuous flight and auger shaft are of one piece hollow molded construction. They are rotationally molded as a unit, from a plastic material, such as polyethylene.

It would thus be seen that the goals of the present invention as set forth in the objects and summary of the invention, as well as in the appended claims, are complied with. It would be understood that various changes may be made in the details of construction, as well as in the use and operation of the apparatus of the present invention, all within the spirit and scope of the invention as recited in the appended claims.

What is claimed is:

1. An auger apparatus for conveying ice, comprising:
   (a) a generally hollow cylindrical auger tube for receiving an auger therein;
   (b) said auger having a continuous, generally spiral flight of multiple revolutions on an auger shaft, on the periphery thereof, and rotatably disposed in the tube for rotation about a longitudinal axis of said shaft;
   (c) an ice inlet opening at a first end of the tube for receiving ice therein for delivery along said flight, between adjacent revolutions of the flight;
   (d) an ice outlet opening at a second end of the tube for receiving ice for discharge from the tube; and
   (e) the continuous auger flight being a one-piece hollow molded member.

2. The auger apparatus of claim 1, wherein both said auger continuous flight and the auger shaft comprise a one-piece hollow molded member.

3. The auger apparatus of claim 2, wherein said auger flight and auger shaft are rotationally molded.

4. The auger apparatus of anyone of claims 2–3, wherein the continuous flight has a forward active delivery surface for engaging and pushing ice through said tube and a rearward passive surface; with said active and passive surfaces being at an included angle to each other when measured in cross-section at right angles through said flight and intersecting said shaft axis, that is in the range of 35° to 42°.

5. The auger apparatus of claim 4, wherein said included angle is substantially 38°.

6. The auger apparatus of anyone of claims 2–3, wherein said auger flight and auger shaft are comprised of a molded plastic material.

7. The auger apparatus of anyone of claims 2–3, wherein the auger shaft is free of any cylindrical bearings disposed thereabout.

8. Apparatus for storing ice in a storage bin and for dispensing ice from a storage bin, comprising:
   (a) a storage bin for receiving pieces of ice therein;
   (b) ice dispenser means for engaging pieces of ice and delivering them to a dispenser outlet for dispensing ice from the storage bin;
   (c) said dispenser means comprising an auger apparatus for conveying ice, that comprises;
      (i) a generally hollow cylindrical auger tube for receiving an auger therein;
      (ii) said auger having a continuous, generally spiral flight of multiple revolutions on an auger shaft, on the periphery thereof, and rotatably disposed in the tube for rotation about a longitudinal axis of said shaft;
      (iii) an ice inlet opening at a first end of the tube for receiving ice therein for delivery along said flight, between adjacent revolutions of the flight;
      (iv) an ice outlet opening at a second end of the tube for receiving ice for discharge from the tube; and
      (v) the continuous auger flight being a one-piece hollow molded member.

9. The apparatus of claim 8, wherein both said auger continuous flight and the auger shaft comprise a one-piece hollow molded member.

10. The apparatus of claim 9, wherein said auger flight and auger shaft are rotationally molded.

11. The apparatus of anyone of claims 9 and 10, wherein the continuous flight has a forward active delivery surface for engaging and pushing ice through said tube and a rearward passive surface; with said active and passive surfaces being at an included angle to each other when measured in cross-section at right angles through said flight and intersecting said shaft axis, that is in the range of 35° to 42°.

12. The apparatus of claim 11, wherein said included angle is substantially 38°.

13. The apparatus of any one of claims 9 and 10, wherein said auger flight and auger shaft are comprised of a molded plastic material.

14. The apparatus of anyone of claims 9 and 10, wherein the auger shaft is free of any cylindrical bearings disposed thereabout.

15. An auger for conveying ice comprising a continuous generally spiral flight of multiple revolutions on an auger shaft, on the periphery thereof, for rotation about a longitudinal axis of said shaft; the auger continuous flight and auger shaft comprising a one-piece hollow, rotationally molded member, wherein the continuous flight has a forward active delivery surface for engaging and pushing ice and a rearward passive surface; with said active and passive surfaces being at an included angle to each other when measured in cross-section at right angles through said flight and intersecting said shaft axis, that is in the range of 35° to 42°.

16. The auger of claim 15, wherein said included angle is substantially 38°.

17. The auger of claim 15, wherein said included angle is substantially 38°; and wherein said auger flight and auger shaft are comprised of molded plastic material; and wherein the auger shaft is free of any cylindrical bearings disposed thereabout.

18. The apparatus of any one of claims 1 and 8, wherein the auger flight, as configured at its periphery, is flat, such that it comprises means facilitating a bearing surface at the periphery of the auger, as the auger rotates in its operation.

19. The apparatus of claim 18, wherein the thickness of the flat at the periphery of the auger flight is approximately ½ inch.

* * * * *

UNITED STATES PATENT AND TRADEMARK OFFICE
CERTIFICATE OF CORRECTION

PATENT NO.    : 6,860,408 B2
DATED         : March 1, 2005
INVENTOR(S)   : Richard B. Hawkes It is certified that error appears in the above-identified patent and that said Letters Patent is hereby corrected as shown below:

Column 1,
Lines 49 to 50, after "when measured" insert -- in cross-section at right angles --

Column 2,
Line 27, after "particles," insert -- shavings, --

Column 4,
Lines 17, 27, 30 and 60, after "of" delete "anyone" insert -- any one --

Signed and Sealed this

Tenth Day of May, 2005

JON W. DUDAS
*Director of the United States Patent and Trademark Office*